July 23, 1963 P. R. SHEPLER 3,098,659
FRICTION-SPRING ARRANGEMENT FOR SHAFT SEALS
Filed Sept. 13, 1960 2 Sheets-Sheet 1
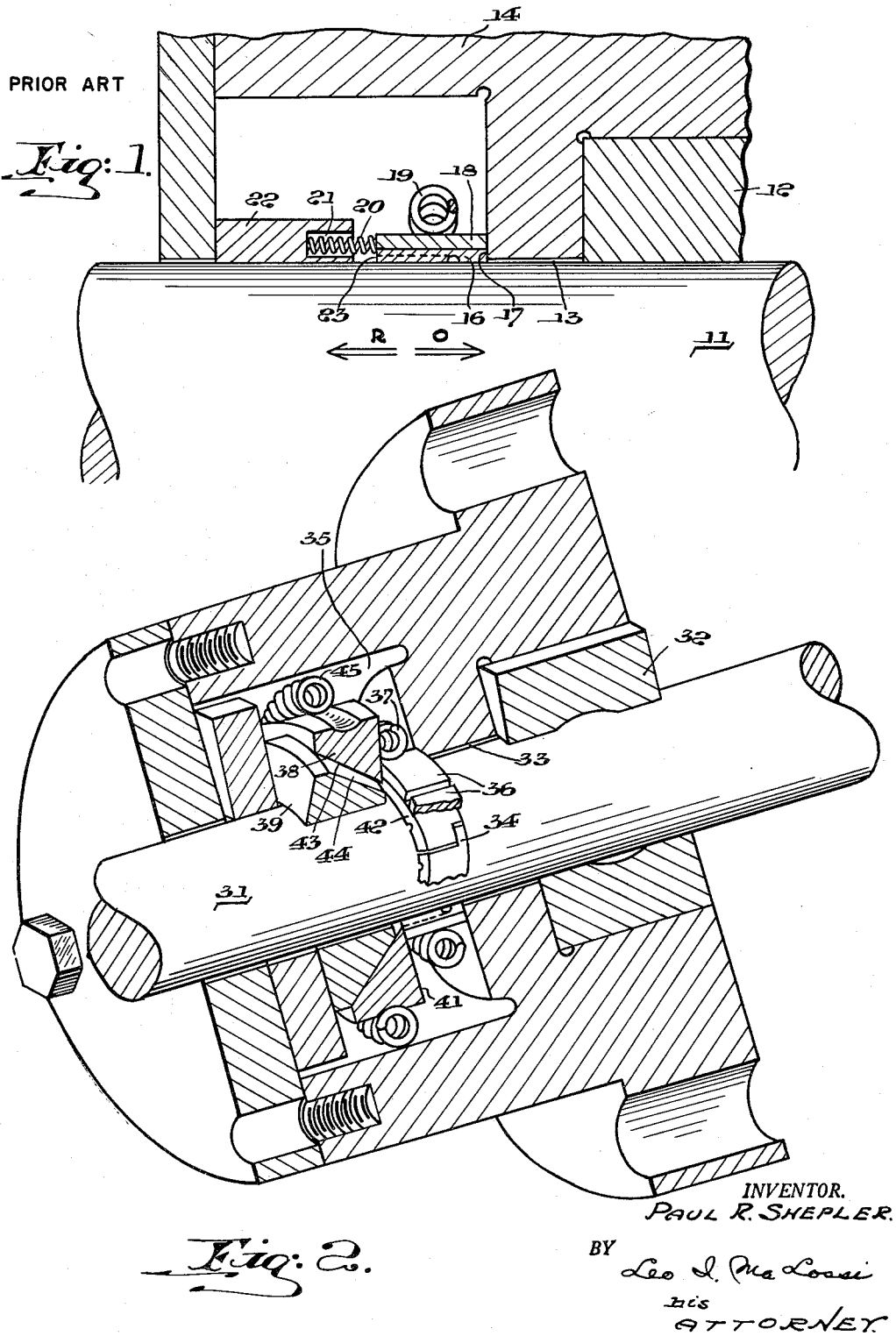
INVENTOR.
PAUL R. SHEPLER.
BY Leo I. MaLossi
his ATTORNEY.

July 23, 1963    P. R. SHEPLER    3,098,659
FRICTION-SPRING ARRANGEMENT FOR SHAFT SEALS
Filed Sept. 13, 1960    2 Sheets-Sheet 2

R ⟵ DIRECTION OF AXIAL SHAFT MOVEMENT $PR = N_1 + F_1$

⟹ O DIRECTION OF AXIAL SHAFT MOVEMENT $PO = N_1 + [-F_1]$

INVENTOR.
PAUL R. SHEPLER.
BY Leo J. MaLossi.
his
ATTORNEY

3,098,659
FRICTION-SPRING ARRANGEMENT FOR
SHAFT SEALS
Paul R. Shepler, Towson, Md., assignor to Koppers
Company, Inc., a corporation of Delaware
Filed Sept. 13, 1960, Ser. No. 55,655
2 Claims. (Cl. 277—144)

The present invention relates to an improved fluid seal and, more particularly, to an arrangement for applying a biasing force to retain a shaft seal in close contact with its sealing face irrespective of axial motion of the shaft.

In the typical prior art arrangement, ordinary helical springs are employed to bias the seal against the sealing face by means of a force exerted along the perimeter of the shaft. Such an arrangement has proven unsatisfactory in those applications in which the shaft either reciprocates or so rotates that some axial motion is experienced. The inadequacy of the prior system is caused by the fact that the forces exerted by the helical springs are constant with the result that when the shaft moves axially so as to carry the seal toward the sealing face, adequate closure is obtained from the spring bias, but when the shaft moves axially so as to carry the sealing ring away from the sealing face, the force exerted by the helical springs fails to hold the sealing ring against the sealing face and leakage occurs.

Accordingly, it is an object of this invention to provide an improved fluid seal biasing device capable of exerting a greater force when there is axial movement of the shaft tending to carry the sealing ring away from its sealing face than when the shaft moves in the opposite direction tending to carry the sealing ring toward its sealing face.

Another object of the present invention is to provide an improved fluid seal biasing device capable of maintaining a sealing ring about a reciprocating shaft in constant sealing contact with its sealing face.

The present invention therefore contemplates an improved fluid seal for an axially moveable shaft wherein the sealing ring within the sealing housing is constantly biased into engagement with the sealing face of the sealing housing but in which the biasing force varies whereby there is a greater biasing force applied against the sealing ring whenever the shaft moves axially in such a direction as to tend to separate the sealing ring from the sealing face.

Further objects, advantages and features will become apparent upon examination of the accompanying discussion, drawings, and appended claims. More complete understanding of this invention will be facilitated by reference to the drawings in which:

FIGURE 1 is a cross-sectional view through a shaft, bearing and seal assembly typical of the prior art.

FIGURE 2 is an isometric view partly broken away of a shaft, bearing and seal arrangement embodying the present invention.

Figure 3:
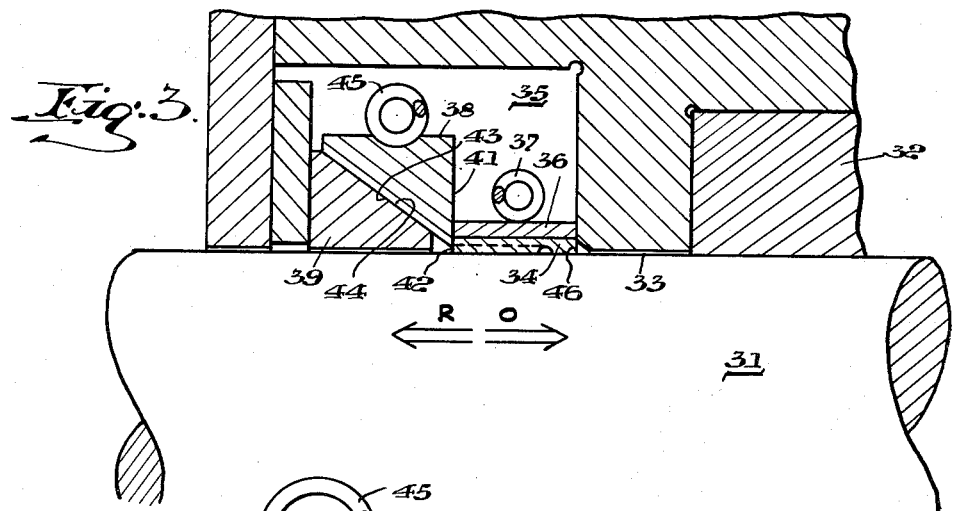
FIGURE 3 is a cross-sectional view taken through the control axis of the shaft, bearing and seal assembly shown in FIGURE 2.

In FIGURE 1 is shown an example of prior art devices used for biasing shaft seals. In the shaft, bearing and seal assembly shown in FIGURE 1, shaft 11 is supported in bearing 12 and either moves therein with a reciprocating motion or rotates relative thereto with some substantial axial motion. In order to provide a fluid seal for the clearance or gap 13 between sealing housing 14 and shaft 11 as a closure to prevent both the egress of lubricant from the assembly and the ingress thereto of dust or other foreign matter, metallic sealing ring 16 abutting sealing face 17 of fixed housing 14 is provided.

Surrounding sealing ring 16 and concentric therewith are split metallic outer ring 18 and garter spring 19 which two elements align and support sealing ring 16. In order to bias sealing ring 16 against sealing face 17, this assembly is provided with helical springs 20 housed in an annular recess 21 spring block 22 which springs provide an axially applied force of constant magnitude and direction against the edge 23 of sealing ring 16.

Whenever shaft 11 moves in the direction indicated by the arrow O, the tendency is to move seal 16 into more intimate contact with sealing face 17 under the biasing force of springs 20 and the fluid seal obtained is very satisfactory. However, should shaft 11 move axially in the direction shown by arrow R, sealing ring 16 tends to move with shaft 11 and is carried away from sealing face 17 because the force of spring 21 and the hydraulic axial force on seal ring 16 is insufficient to hold seal 16 against sealing face 17 under these conditions. Such action, of course, results in an unsatisfactory fluid seal.

If, on the other hand, the biasing force acting upon sealing ring 16, instead of having a constant value, has the capacity to vary depending upon the direction of movement of shaft 11 whereby a larger force would be applied to bias sealing ring 16 in the event of axial movement of shaft 11 in the direction of arrow R, leakage could be maintained at a minimum.

To provide just such an application of variable biasing force, the structure shown in FIGURE 2 has been devised. Herein is shown a shaft, bearing and seal assembly wherein shaft 31 either reciprocates relative to bearing 32 or has rotary motion relative thereto with some substantial axial motion. As is provided for clearance 13 in FIGURE 1, clearance 33 is provided with a fluid seal by employing metallic sealing ring 34, which as is typical, is segmented. This sealing ring 34 is disposed in recess 35 together with the typical metallic split outer ring 36 and garter spring 37.

The biasing force for sealing ring 34 is provided through two metallic concentric rings 38 and 39, each of which is wedge-shaped in cross-section. These rings are disposed with their conical surfaces, 43 and 44 respectively, coincident with one another with annular plane surface 41 of outer ring 38 abutting the rim 42 of sealing ring 34 and outer ring 36. Inner ring 39 is the male or solid ring while outer ring 38 is the female or split ring. Since outer ring 38 is split, it may be moved in an axial direction relative to ring 39 with conical surface 43 sliding over conical surface 44. Garter spring 45 exerts an unchanging vertical force on outer ring 38 maintaining the conical surfaces 43 and 44 of rings 38 and 39 respectively in constant contact. These rings, 38 and 39, are preferably made of the same material as the sealing ring 34, that is, of unusual high-speed steel of greater hardness, hot hardness, wear resistance, and cutting efficiency than the usual high-speed steel.

It has been found that in the proper execution of this invention, the coefficient of friction of the materials used to form rings 38 and 39 should be in the range from .2 to about .6 and the angle of incidence between the mating surfaces 43 and 44 and the centerline of shaft 31 should be in the range from about 25° to 50°.

Figure 4:
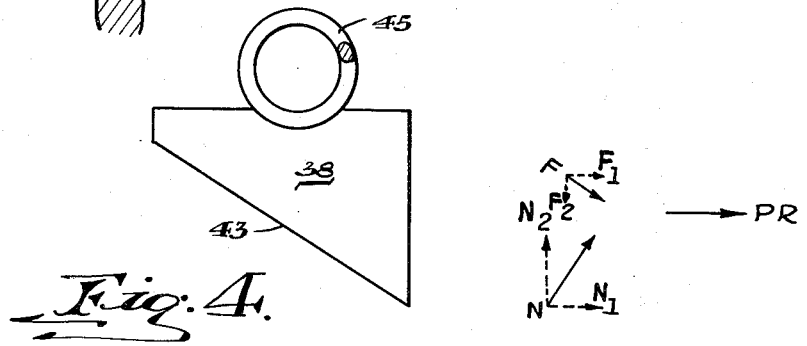
FIGURE 4 is a schematic representation of the balance of forces when the shaft moves axially so as to tend to move the sealing ring away from the sealing face and, FIGURE 5 is a schematic representation similar to FIGURE 4 depicting the conditions when the shaft moves axially in a direction tending to move the sealing ring toward the sealing face.

As an explanation of the manner in which this biasing arrangement is capable of exerting a greater biasing force against sealing ring 34 when shaft 31 moves axially so as to tend to carry sealing ring 34 away from sealing face 46, reference is made to FIGURES 3 and 4.

Figure 5:
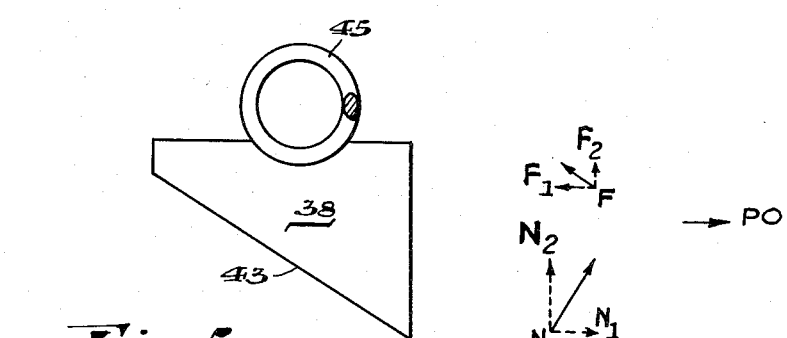

In essence, in this type of friction spring arrangement the outer ring, split-ring 38 rides up the conical surface 44 against the force of friction when shaft 31 is moved so as to pull sealing ring 34 away from sealing face 46 and rides down conical surface 44 against the force of friction when shaft 31 is moved in the opposite direction. As a result of this action, differing forces PR and PO are developed to act upon sealing ring 34. By vector analysis the relative values of the characteristic forces PR and PO may be shown. PR is the resultant force exerted by outer ring 38 upon sealing ring 34 when shaft 31 moves in direction R (FIGURE 4). PO is the resultant force exerted by outer ring 38 upon sealing ring 34 when shaft 31 moves in direction O (FIGURE 5). Referring to FIGURE 4, it is shown therein that the force N acting on outer ring 38 acts normal to conical surface 43 and has a vertical component and a horizontal component represented by $N_2$ and $N_1$ respectively. Likewise, there is a friction force F acting on outer ring 38 which force acts contra the direction of axial shaft movement. As shown, F has horizontal and vertical components represented by letters $F_1$ and $F_2$ respectively. Therefore, as would be expected, the biasing force PR is equal to the algebraic sum of the horizontal components or $N_1$ plus $F_1$ in that situation in which shaft 31 moves axially in direction R.

In contrast thereto, in FIGURE 5, the same force N acts in the same direction and with the same magnitude since this force is independent of the shaft movement, but we see that the friction force F now acts in the opposite direction in order to remain contra the direction of shaft movement. Therefore, under this set of conditions, the force PO which is the biasing force available, is equal to the algebraic sum of the horizontal components of forces N and F or $N_1 + (-F_1)$. In this manner, it has been graphically shown that the force PR which acts when shaft 31 moves in direction R tending to move sealing ring 34 away from sealing face 46, is a greater force than force PO which acts when shaft 31 moves in the opposite direction.

The difference between these forces PR and PO may be varied as conditions warrant either by changing the material and thereby the coefficient of friction or by increasing or decreasing the angle of incidence between the mating conical surfaces 43, 44 and the center line of the shaft 31. In addition, to provide vertical forces for maintaining intimate contact between the inner surface of segmented sealing ring 34 and the outer surface of shaft 31, and between the mating conical surfaces 43 and 44, split outer ring 34 and outer conical ring 38 respectively, may be of the type having inherent spring characteristics as is conventional practice in piston ring art, thereby eliminating the need for garter springs 37 and 45.

As has been indicated by tests of this particular springing system, its use has greatly reduced leakage in all sealing arrangements in which it has been applied showing that the actual performance of conical friction springs agrees with the theoretical analysis.

Although this entire discussion has been directed to shaft sealing applications, this invention is equally adaptable to piston seals by simply reversing the arrangement applying a force acting radially outward to provide normal force N to force a split inner ring against a solid outer ring riding against the cylinder wall.

Obviously, many modifications and variations of the present invention are possible in the light of the above teachings. It is therefore to be understood, that within the scope of the appended claims, the invention may be practiced otherwise than as specifically described.

What is claimed is:

1. A fluid seal for an axially moveable rotating shaft comprising a sealing housing about said shaft, a sealing face formed on one wall thereof, an annular sealing ring disposed within said housing and encircling said shaft and means arranged in said housing girding said shaft in non-sealing engagement therewith and abutting said sealing ring for biasing said sealing ring against said sealing face with a force varying with the direction of axial movement of said shaft, said force being increased as the axial movement of said shaft tends to separate said sealing ring from said sealing face and said force being diminished as the axial movement of said shaft tends to urge said sealing ring toward said sealing face, said biasing means comprising an outer annular split-ring, an inner solid annular ring and a spiral spring encircling said split-ring and applying a radially-directed force thereto, said solid ring having a conical outer surface, said split-ring having a conical inner surface in mating relationship with said conical outer surface and slidable relative thereto and said split-ring having an annular plane surface abutting the rim of the sealing ring.

2. In a fluid seal for a shaft, bearing and seal assembly wherein an annular sealing ring is required to effect a fluid seal between a relatively rotating shaft and a fixed member surrounding said shaft with a biasing arrangement being employed for urging the annular sealing ring against a sealing face formed circumjacent the clearance between the fixed member and the shaft whereby the sealing of the clearance is produced, the improvement comprising means girding said rotating shaft in non-sealing engagement therewith and abutting said sealing ring for biasing said sealing ring against said sealing face with a force varying with the direction of axial movement of said rotating shaft, said force being increased as the axial movement of said shaft tends to separate said sealing ring from said sealing face and said force being diminished as the axial movement of said shaft tends to urge said sealing ring toward said sealing face, said means being an outer annular split-ring having a wedged-shaped cross-section and an annular plane surface abutting the rim of said sealing ring, a solid annular ring having a wedge-shaped cross-section disposed with the conical surface thereof coincident with the conical surface of said split ring and spring means encircling said split-ring and applying a radially-directed force thereto.

References Cited in the file of this patent

UNITED STATES PATENTS

| 317,869 | Smith et al. | May 12, 1885 |
| 400,438 | Cockfield et al. | Apr. 2, 1889 |
| 1,290,985 | Harris | Jan. 14, 1919 |
| 1,412,251 | Marshall | Apr. 11, 1922 |
| 2,998,987 | Taschenberg et al. | Sept. 5, 1961 |

FOREIGN PATENTS

| 108,963 | Great Britain | Aug. 30, 1917 |
| 170,692 | Switzerland | Oct. 1, 1934 |
| 894,684 | France | Mar. 20, 1944 |